United States Patent
Song

(10) Patent No.: US 12,448,420 B2
(45) Date of Patent: Oct. 21, 2025

(54) PHARMACEUTICAL COMPOSITION, COMPRISING RECOMBINANT STABILIZED GALECTIN 9 PROTEIN, FOR PREVENTION OR TREATMENT OF RHEUMATOID ARTHRITIS AND BONE DISEASE

(71) Applicant: GBIOLOGICS INC., Seongnam-si (KR)

(72) Inventor: Dong Ho Song, Seongnam-si (KR)

(73) Assignee: GBIOLOGICS INC., Seongnam-si (KR)

( * ) Notice: Subject to any disclaimer, the term of this patent is extended or adjusted under 35 U.S.C. 154(b) by 814 days.

(21) Appl. No.: 17/763,902

(22) PCT Filed: Nov. 11, 2020

(86) PCT No.: PCT/KR2020/015782
§ 371 (c)(1),
(2) Date: Mar. 25, 2022

(87) PCT Pub. No.: WO2021/096217
PCT Pub. Date: May 20, 2021

(65) Prior Publication Data
US 2022/0372088 A1    Nov. 24, 2022

(30) Foreign Application Priority Data

Nov. 11, 2019  (KR) .......................... 10-2019-0143752
Nov. 10, 2020  (KR) .......................... 10-2020-0149295

(51) Int. Cl.
| *A61K 38/17* | (2006.01) |
| *A61P 19/02* | (2006.01) |
| *A61P 19/10* | (2006.01) |
| *C07K 14/47* | (2006.01) |
| *C12N 15/66* | (2006.01) |

(52) U.S. Cl.
CPC .............. *C07K 14/47* (2013.01); *A61K 38/17* (2013.01); *A61K 38/1732* (2013.01); *A61P 19/02* (2018.01); *A61P 19/10* (2018.01); *C07K 14/4726* (2013.01); *C12N 15/66* (2013.01)

(58) Field of Classification Search
CPC ............... C07K 14/4726; C07K 14/47; A61K 38/1732; A61K 38/17
See application file for complete search history.

(56) References Cited

U.S. PATENT DOCUMENTS

2015/0307574 A1* 10/2015 Nishi ..................... A61P 43/00
435/320.1

FOREIGN PATENT DOCUMENTS

| JP | 2003-189874 A | 7/2003 |
| JP | 2012-515766 A | 7/2012 |
| KR | 10-2007-0031887 A | 3/2007 |
| WO | WO-2014080703 A1 * | 5/2014 ............. A61K 38/00 |

OTHER PUBLICATIONS

International Search Report dated Feb. 17, 2021 for International Application No. PCT/KR2020/015782, 9 pages with English translation.
Seki et al., "Galectin-9 suppresses the generation of Th17, promotes the induction of regulatory T cells, and regulates experimental autoimmune arthritis", Clinical Immunology, 2008, vol. 127, pp. 78-88.

* cited by examiner

*Primary Examiner* — Xiaozhen Xie
(74) *Attorney, Agent, or Firm* — MH2 Technology Law Group, LLP

(57) ABSTRACT

The present invention relates to a recombinant stabilized galectin 9 protein and the use thereof, and more specifically, relates to a pharmaceutical composition comprising the recombinant stabilized galectin 9 protein for prevention or treatment of rheumatoid arthritis and a bone disease. The recombinant stabilized galectin 9 protein differs from the wild-type galectin 9 protein in that the amino acids in the link region connecting two carbohydrates recognition domains (CRDs) are deleted, and the amino acids in the C-terminal CRD (CCRD) are deleted and substituted.

4 Claims, 3 Drawing Sheets

Specification includes a Sequence Listing.

▶ Bone resorption

CON

RANKL

CON      sGal-9 sGal-9: 2μg/mL

SEQUENCE LISTING

```
<160> NUMBER OF SEQ ID NOS: 3

<210> SEQ ID NO 1
<211> LENGTH: 284
<212> TYPE: PRT
<213> ORGANISM: Artificial
<220> FEATURE:
<223> OTHER INFORMATION: sGal-9

<400> SEQUENCE: 1

Met Ala Phe Ser Gly Ser Gln Ala Pro Tyr Leu Ser Pro Ala Val Pro
1               5                   10                  15

Phe Ser Gly Thr Ile Gln Gly Gly Leu Gln Asp Gly Leu Gln Ile Thr
            20                  25                  30

Val Asn Gly Thr Val Leu Ser Ser Ser Gly Thr Arg Phe Ala Val Asn
        35                  40                  45

Phe Gln Thr Gly Phe Ser Gly Asn Asp Ile Ala Phe His Phe Asn Pro
    50                  55                  60
```

Arg Phe Glu Asp Gly Gly Tyr Val Val Cys Asn Thr Arg Gln Asn Gly
65                  70                  75                  80

Ser Trp Gly Pro Glu Arg Lys Thr His Met Pro Phe Gln Lys Gly
            85                  90                  95

Met Pro Phe Asp Leu Cys Phe Leu Val Gln Ser Ser Asp Phe Lys Val
            100                 105                 110

Met Val Asn Gly Ile Leu Phe Val Gln Tyr Phe His Arg Val Pro Phe
            115                 120                 125

His Arg Val Asp Thr Ile Ser Val Asn Gly Ser Val Gln Leu Ser Tyr
            130                 135                 140

Ile Ser Phe Gln His Pro Pro Tyr Pro Met Pro Phe Ile Thr Thr Ile
145                 150                 155                 160

Leu Gly Gly Leu Tyr Pro Ser Lys Ser Ile Leu Leu Ser Gly Thr Val
                165                 170                 175

Leu Pro Ser Ala Gln Arg Phe His Ile Asn Leu Cys Ser Gly Asn His
            180                 185                 190

Ile Ala Phe His Leu Asn Pro Arg Phe Asp Glu Asn Ala Val Val Arg
            195                 200                 205

Asn Thr Gln Ile Asp Asn Ser Trp Gly Ser Glu Glu Arg Ser Leu Pro
210                 215                 220

Arg Lys Met Pro Phe Val Arg Gly Gln Ser Phe Ser Val Trp Ile Leu
225                 230                 235                 240

Cys Glu Ala His Cys Leu Lys Val Ala Val Asp Gly Gln His Leu Phe
                245                 250                 255

Glu Tyr Tyr His Arg Leu Arg Asn Leu Pro Thr Ile Asn Arg Leu Glu
            260                 265                 270

Val Gly Gly Asp Ile Gln Leu Thr His Val Gln Thr
            275                 280

<210> SEQ ID NO 2
<211> LENGTH: 146
<212> TYPE: PRT
<213> ORGANISM: Artificial
<220> FEATURE:
<223> OTHER INFORMATION: CCRD

<400> SEQUENCE: 2

Thr Pro Ala Ile Pro Pro Met Met Tyr Pro His Pro Ala Tyr Pro Met
1               5                   10                  15

Pro Phe Ile Thr Thr Ile Leu Gly Gly Leu Tyr Pro Ser Lys Ser Ile
            20                  25                  30

Leu Leu Ser Gly Thr Val Leu Pro Ser Ala Gln Arg Phe His Ile Asn
            35                  40                  45

Leu Cys Ser Gly Asn His Ile Ala Phe His Leu Asn Pro Arg Phe Asp
        50                  55                  60

Glu Asn Ala Val Val Arg Asn Thr Gln Ile Asp Asn Ser Trp Gly Ser
65                  70                  75                  80

Glu Glu Arg Ser Leu Pro Arg Lys Met Pro Phe Val Arg Gly Gln Ser
            85                  90                  95

Phe Ser Val Trp Ile Leu Cys Glu Ala His Cys Leu Lys Val Ala Val
            100                 105                 110

Asp Gly Gln His Leu Phe Glu Tyr Tyr His Arg Leu Arg Asn Leu Pro
            115                 120                 125

Thr Ile Asn Arg Leu Glu Val Gly Gly Asp Ile Gln Leu Thr His Val
            130                 135                 140

```
Gln Thr
145

<210> SEQ ID NO 3
<211> LENGTH: 10
<212> TYPE: PRT
<213> ORGANISM: Artificial
<220> FEATURE:
<223> OTHER INFORMATION: CCRD 1-10

<400> SEQUENCE: 3

Thr Pro Ala Ile Pro Pro Met Met Tyr Pro
1               5                   10
```

PHARMACEUTICAL COMPOSITION, COMPRISING RECOMBINANT STABILIZED GALECTIN 9 PROTEIN, FOR PREVENTION OR TREATMENT OF RHEUMATOID ARTHRITIS AND BONE DISEASE

CROSS-REFERENCE TO RELATED APPLICATIONS

This application is a U.S. National Stage application of PCT/KR2020/015782 filed 11 Nov. 2020, which claims priority to Korean Application No. 10-2019-0143752 filed 11 Nov. 2019 and Korean Application No. 10-2020-0149295 filed on 10 Nov. 2020, the entire disclosures of which are hereby incorporated by reference in their entireties.

SEQUENCE LISTING

The present application contains a Sequence Listing which has been submitted electronically in ASCII format and is hereby incorporated by reference in its entirety. Said ASCII copy, created on 4 Mar. 2022, is named 0435_0001-US_Sequence_Lisiting.txt and is 4.33 kilobytes in size.

TECHNICAL FIELD

The present invention relates to a recombinant stabilized galectin 9 protein and the use thereof, and specifically relates to a pharmaceutical composition, comprising recombinant stabilized galectin 9 protein, for prevention or treatment of rheumatoid arthritis and bone disease.

BACKGROUND ART

It has been found that there are animal lectins that specifically recognize sugar chains having a β-galactosidic structure in living bodies, and at least 14 genes have been identified so far. Galectins are classified into prototype, chimeras, and tandem repeats based on the structures thereof.

Galectin 9, one of the tandem repeat galectins, includes two sugar chain recognition sites (carbohydrate recognition domains: CRD) and a link peptide region connecting the sites and has N-terminal domain (N-Terminal Carbohydrate Recognition Domain; NCRD) and a C-terminal domain (C-terminal Carbohydrate Recognition Domain; CCRD) connected by the link peptide region, and various activities have reported so far. Regarding T cells, galectin 9 binds to Tim-3 to induce apoptosis of Tim-3-positive Th1 cells, and inhibits excessive Th1 responses to suppress autoimmune inflammation. In addition, galectin 9 reduces Th17 cells that are one of causes or exacerbation factors of various intractable diseases such as autoimmune diseases, allergies, and cancers expressed by Tim-3.

On the other hand, galectin 9 enhances immunity in some cases. Galectin 9 binds to Tim-3 on monocytes or dendritic cells to activate the cells and promote the production of inflammatory cytokines. In addition, the interaction of galectin 9 and Tim-3 in macrophages enhances immunity to exclude Mycobacterium tuberculosis.

In addition, evidence suggesting the existence of a genetic polymorphism among the galectin 9 genes cloned from human cells or tissues is confirmed, and the recombinant galectin 9 produced using E. coli as a host is known to have an effect of inducing metastasis inhibition and regression of cancer and an effect of inducing apoptosis of activated T cells, particularly CD4-positive T cells which are the cause of an excessive immune response, by direct action on tumor cells (activation to induce intercellular adhesion between tumor cells and apoptosis) and action through the immune system. In addition, a therapeutic effect of human immunodeficiency virus (HIV) infection, a therapeutic effect of atopy and asthma, and a therapeutic effect of type 1 diabetes are known.

In using galectin 9 as an actual therapeutic agent, in order to solve the problems of 1) protease sensitivity; 2) low solubility; and 3) low yield, a study of cleaving the linker peptide of galectin 9 to produce a galectin 9 variant (G9Null; Non-Patent Document 1) with proteolytic enzyme resistance and the like is continued, and an effect such as KRAS mutant colon carcinoma antitumor activity (Non-Patent Document 2) is known.

Meanwhile, a bone is a dynamic tissue that undergoes continuous removal and reconstruction through bone resorption and formation. These processes are carried out by two types of cells: osteoclasts and osteoblasts, respectively. Specifically, osteoblasts are responsible for bone formation, and osteoclasts are responsible for bone removal. In a normal environment, bone homeostasis is maintained by the balanced activity of the two cells. However, homeostasis can be disrupted by abnormal hyperactivity of these two types of cells, particularly osteoclasts, resulting in a bone disease such as arthritis, osteoporosis, periprosthetic osteolysis, and Paget's disease. Therefore, accurate regulation of osteoclast differentiation and functions is important in the prevention and treatment of a bone disease.

For example, as a drug therapy for treating osteoporosis, as a drug that prevents a decrease in bone mass or increases bone mass by promoting bone formation or suppressing bone resorption, there are bone resorption inhibitors such as calcium preparations, vitamin D preparations, bisphosphonate preparations, estrogen agonists/antagonists, and estrogen preparations, and osteogenesis promoters such as teriparatide injection that is a parathyroid hormone preparation.

Also, among arthritis, rheumatoid arthritis is a typical chronic autoimmune disease and is a disease caused by inflammation in a synovial tissue that surrounds a joint. The rheumatoid arthritis is a disease that can occur in any joint where the synovial membrane exists and that invades various organs throughout the body, and is a chronic inflammatory disease that destroys articular tissues to cause severe joint disorders and lead to premature death. In some severe cases, though the cases are rare, tissues other than joints, for example, the lungs, the heart, the eyes, the gastrointestinal tract, the skin, and the kidneys may be involved. Moreover, generally, inflammatory mediators that are secreted in the body in large amounts adversely affect bone metabolism, thereby increasing the risk of osteoporosis and fractures. In reality, it is confirmed that the incidence of osteoporosis in rheumatoid arthritis patients is about 15% to 20%.

Drug therapies for treating rheumatoid arthritis include primary drugs such as nonsteroidal anti-inflammatory drugs and steroid preparations, which are a kind of hormone, and secondary drugs that suppress rheumatoid arthritis itself by affecting the immune system of the body, and are usually used for a long period of time, thereby requiring attention to side effects. In particular, steroid preparations may be abused because good effects are exhibited immediately, but problems of side effects are serious. The long-term use thereof may be a risk factor for osteoporosis.

Accordingly, the present inventors have made efforts to develop a new therapeutic agent having an effective therapeutic effect while minimizing the side effects of a therapeutic agent for arthritis, including rheumatoid arthritis, and/or osteoporosis. As a result, it is confirmed that stabilized galectin 9 protein in which amino acids of the C-terminal domain (CCRD) of the two sugar chain recognition sites and of link peptides of the existing wild-type galectin 9 are deleted and substituted have an effect of suppressing Th1 and Th17 differentiation and inducing fibroblast-like synoviocytes (FLS) apoptosis, thereby suppressing the differentiation of osteoclasts, and the present invention is completed on the basis thereof.

SUMMARY OF INVENTION

Technical Problem

An object of the present invention is to provide a recombinant stabilized galectin 9 protein and a pharmaceutical composition for prevention or treatment of a bone disease including the same.

Solution to Problem

In order to achieve the object of the present invention, the present invention provides a recombinant stabilized galectin 9 protein having the amino acid sequence represented by SEQ ID NO: 1.

In addition, the present invention provides a recombinant vector including a gene that encodes the protein.

In addition, the present invention provides a transformant into which the recombinant vector is inserted.

In addition, the present invention provides a pharmaceutical composition for prevention or treatment of a bone disease, including a recombinant stabilized galectin 9 protein having an amino acid sequence represented by SEQ ID NO: 1 or a polynucleotide that encodes the same, as an active ingredient; a method for treating a bone disease, including administering, to an individual, a pharmaceutically effective amount of a recombinant stabilized galectin 9 protein having the amino acid sequence represented by SEQ ID NO: 1 or a polynucleotide encoding the same; a pharmaceutical composition including a recombinant stabilized galectin 9 protein having an amino acid sequence represented by SEQ ID NO: 1 or a polynucleotide that encodes the same for use in the prevention or treatment of a bone disease; and the use of a recombinant stabilized galectin 9 protein having an amino acid sequence represented by SEQ ID NO: 1 or a polynucleotide that encodes the same for the preparation of a pharmaceutical composition for prevention or treatment of a bone disease.

Also, the present invention provides a health functional food for prevention or improvement of a bone disease, including a recombinant stabilized galectin 9 protein having the amino acid sequence represented by SEQ ID NO: 1, as an active ingredient; a method for preventing or improving a bone disease, including administering, to an individual, a pharmaceutically effective amount of a recombinant stabilized galectin 9 protein having the amino acid sequence represented by SEQ ID NO: 1 or a polynucleotide that encodes the same; a health functional food including a recombinant stabilized galectin 9 protein having an amino acid sequence represented by SEQ ID NO: 1 or a polynucleotide that encodes the same for use in prevention or improvement of a bone disease; and the use of a recombinant stabilized galectin 9 protein having an amino acid sequence represented by SEQ ID NO: 1 or a polynucleotide that encodes the same for the preparation of a health functional food for preventing or improving a bone disease.

Advantageous Effects of Invention

The recombinant stabilized galectin 9 protein of the present invention exhibits Th1 and Th17 cell differentiation inhibitory effects, fibroblast-like synoviocytes (FLS) apoptosis effects and osteoclast differentiation inhibitory effects, and thus can be usefully used as an active ingredient in a composition for prevention or treatment of a bone disease including rheumatoid arthritis.

DESCRIPTION OF EMBODIMENTS

Figure 1:
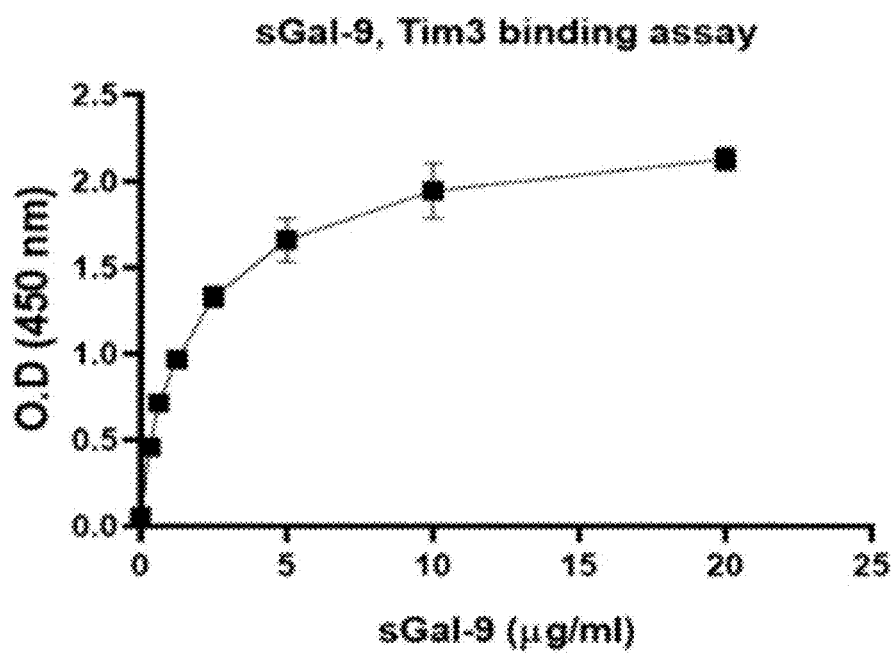
FIG. 1 is a figure showing a binding degree of a recombinant stabilized galectin 9 protein (sGal-9) according to the present invention to Tim-3.

Hereinafter, embodiments of the present invention will be described in detail so that those of ordinary skill in the art to which the present invention pertains can easily carry out the present invention. The embodiments of the present invention are provided in order to more completely explain the present invention to those of ordinary skill in the art to which the present invention pertains. Accordingly, the embodiment of the present invention may be modified in various other forms, and the scope of the present invention is not limited to the embodiments described below.

Throughout the specification of the present invention, if it is said that any part "includes" any component, this means that other components may be further included, rather than excluding the other components, unless otherwise stated.

The present invention provides a recombinant stabilized galectin 9 protein having an amino acid sequence represented by SEQ ID NO: 1.

In the present invention, the recombinant stabilized galectin 9 protein has a more stable molecular structure to a protease while maintaining the sugar chain recognition activity of wild type Galectin-9.

Specifically, the recombinant stabilized galectin 9 protein is a recombinant protein prepared by modifying a link region connecting two carbohydrate recognition domains (CRDs) of wild-type galectin 9 having the structure of NCRD-linker-CCRD and a C-terminal carbohydrate recognition domain (CCRD). More specifically, the recombinant stabilized galectin 9 protein is obtained by deleting all peptides of the linker region, deleting the amino acid sequence at positions 1 to 10 (SEQ ID NO: 3) in CCRD (SEQ ID NO: 2), and substituting Ala (Alanine; A) at position 13 with Pro (Proline; P), may include the amino acid sequence represented by SEQ ID NO: 1, may include an amino acid sequence having sequence homology of 75% or more, preferably 80% or more, more preferably 90% or more with the amino acid sequence represented by SEQ ID NO: 1, and may further include targeting sequences, tags, labeled residues, and an amino acid sequence prepared for a specific purpose to increase half-life or peptide stability.

In addition, the recombinant protein of the present invention can be obtained by various methods well known in the art. As an example, the recombinant protein of the present invention may be prepared using polynucleotide recombination and protein expression systems, may be synthesized in vitro through chemical synthesis such as peptide synthesis, or may be prepared by cell-free protein synthesis.

As used herein, the term "polynucleotide" refers to a polymer to which nucleotides are bound, and serves to transmit genetic information. For the purposes of the present invention, polynucleotide encodes the recombinant protein of SEQ ID NO: 1 and may include sequence having sequence homology of 75% or more, preferably 85% or more, more preferably 90% or more, and most preferably 95% or more with the polynucleotide sequence for encoding the recombinant protein.

As used herein, the term "homology" is intended to indicate a degree of similarity to a wild type amino acid sequence or a polynucleotide sequence, the comparison of such homology can be performed using a comparison program well known in the art, and homology between two or more sequences can be calculated as a percentage (%).

In addition, the present invention provides a recombinant vector including a gene that encodes the protein.

In addition, the present invention provides a transformant into which the recombinant vector is inserted.

As used herein, the term "vector" refers to a plasmid, a virus or other medium well-known in the art into which a gene or a base sequence can be inserted or introduced, specifically may be linear DNA, plasmid DNA, a recombinant non-viral vector, a recombinant viral vector, or an inducible gene expression vector system, and the recombinant viral vector may be a retrovirus, an adenovirus, an adeno-associated virus, a helper-dependent adenovirus, a herpes simplex virus, a lentiviral vector or a vaccinia virus, but the vector is not limited thereto. The base sequence according to the present invention may be operably linked to an expression control sequence, and the operably linked base sequence may be included in one expression vector including a selection marker and a replication origin together. Those that are "operably linked" can be a gene and an expression control sequence that are linked in a manner that enables gene expression when an appropriate molecule is bound to the expression control sequence. The term "expression control sequence" refers to a DNA sequence that controls the expression of an operably linked base sequence in a specific host cell. Such control sequences include promoters for effecting transcription, any operator sequences for regulating transcription, sequences for encoding suitable mRNA ribosome binding sites, and sequences for regulating the termination of transcription and translation.

As used herein, the term "transformation" refers to a change in genetic properties of an organism by a DNA given from the outside, that is, a phenomenon in which when a DNA, which is a type of nucleic acid extracted from a cell of a certain lineage of an organism, is introduced into a living cell of another lineage, the DNA enters the cell and changes in hereditary characteristics. The cell may be a prokaryotic cell or a eukaryotic cell, but is not limited thereto.

In the present invention, the gene that encodes the recombinant protein can be introduced into cells after preparing a primer capable of specifically recognizing the gene from a known sequence as described above, amplifying the gene through a polymerase chain reaction (PCR) by using the primer, and introducing the amplified gene into the vector as described above. The introduction methods are known, and examples thereof include liposome mediated transfection, a calcium phosphate method, DEAE-dextran mediated transfection, positively charged lipid mediated transfection, electroporation, transduction using a phage system, and infection method using a virus. However, the introduction methods are not limited thereto.

In addition, the present invention provides a pharmaceutical composition for prevention or treatment of a bone disease, including the recombinant stabilized galectin 9 protein having the amino acid sequence represented by SEQ ID NO: 1 or a polynucleotide that encodes the same, as an active ingredient.

As used herein, the term "prevention" refers to any action that suppresses or delays an onset of a disease by administration of a composition.

As used herein, the term "treatment" refers to any action in which symptoms of a disease are improved or beneficially changed by administration of the composition.

In the present invention, the recombinant stabilized galectin 9 protein may exhibit one or more of the following properties, thereby having an effect of preventing or treating a bone disease:
  i) increase in a degree of binding Tim-3 protein;
  ii) inhibition of Th1 and Th17 cell differentiation;
  iii) inhibition of T helper cells;
  iv) apoptosis of fibroblast-like synoviocytes (FLS); and
  v) inhibition of osteoclast differentiation and bone resorption.

Specifically, the recombinant stabilized galectin 9 protein can inhibit helper T cells such as Th1 and Th17 through an apoptosis induction mechanism by binding to Tim-3 protein expressed on T cells. In particular, the synoviocytes are one of the important pathologies of rheumatoid arthritis together with inflammatory cytokines, and abnormal proliferation and activation of synoviocytes becomes a problem as the disease progresses, and thus inflammation and destruction of joints may continuously occur.

In addition, the recombinant stabilized galectin 9 protein can cause apoptosis of fibroblast-like synoviocytes that destroys the matrix of articular cartilage by secreting matrix metalloproteinase (MMP) and cathepsin.

In addition, the recombinant stabilized galectin 9 protein can inhibit osteoclast differentiation and bone resorption. In particular, the osteoclasts are multinucleated cells that destroy and absorb bone tissues that are unnecessary in bone growth, and if the balance with osteoblasts that are involved in bone generation and regeneration is disrupted, osteoporosis that causes bone loss may occur. In addition, the bone resorption is a phenomenon in which bone is resorbed by the activity of bone-destroying cells, and bisphosphonates that are generally known osteoporosis drugs inhibit the bone resorption to prevent the exacerbation of osteoporosis.

In the present invention, the bone diseases may be arthritis, osteoporosis, periprosthetic osteolysis, osteolysis caused by fatigue debris of implants, Paget's disease, osteomalacia, rickets, osteopenia, calcium dysregulation, metastatic bone cancer, inflammatory bone losses, secondary bone losses by endocrine disease or drugs, or periodontal diseases accompanied by destruction of alveolar bone, but are not limited thereto.

In addition, the arthritis may be osteoarthritis, degenerative arthritis, rheumatoid arthritis, dissociative osteochondritis, joint ligament damages, meniscus damages, joint misalignment, avascular necrosis or juvenile idiopathic arthritis, but is not limited thereto.

In a specific embodiment of the present invention, the present inventors lysed and purified E. coli cells that induce the expression of the recombinant stabilized galectin 9 protein having the amino acid sequence represented by SEQ ID NO: 1, and then prepared a recombinant protein by using a chromatography method. In addition, it was confirmed that the recombinant protein exhibited Th1 and Th17 cell differentiation inhibitory effects, fibroblast-like-synoviocytes (FLS) apoptosis effects and osteoclast differentiation inhibitory effects. Therefore, the recombinant protein and the polynucleotide that encodes the same can be usefully used as an active ingredient of a composition for prevention and treatment of a bone disease.

Meanwhile, the recombinant protein of the present invention or a polynucleotide that encodes the same may be delivered by pharmaceutically acceptable carriers such as colloidal suspension, powder, saline, lipids, liposomes, microspheres, or nanospherical particles. These can form a complex with a vehicle or be associated therewith and can be delivered in vivo by using a delivery system well-known in the art such as lipids, liposomes, microparticles, gold nanoparticles, polymers, condensation reagents, polysaccharides, polyamino acids, dendrimers, saponins, adsorption enhancing substances or fatty acids.

In addition, examples of pharmaceutically acceptable carriers include lactose, dextrose, sucrose, sorbitol, mannitol, starch, acacia gum, calcium phosphate, alginate, gelatin, calcium silicate, microcrystalline cellulose, polyvinyl pyrrolidone, cellulose, water, syrup, methyl cellulose, methyl hydroxybenzoate, propyl hydroxybenzoate, talc, magnesium stearate and mineral oil, which are commonly used in preparations, but the pharmaceutically acceptable carriers are not limited thereto. Further, in addition to the above components, a lubricant, a wetting agent, a sweetening agent, a flavoring agent, an emulsifying agent, a suspending agent, a preservative, and the like may be additionally included.

According to a desired method, the pharmaceutical composition of the present invention may be administered orally or parenterally (for example, intramuscularly, intravenously, intraperitoneally, subcutaneously, intradermally, or locally applied), and a dosage thereof may vary depending on states and weights of patients, the severity of a disease, drug forms, routes of the administration and time, but may be appropriately selected by those skilled in the art.

The pharmaceutical composition of the present invention is administered in a pharmaceutically effective amount.

As used herein, the term "pharmaceutically effective amount" refers to an amount sufficient to treat a disease with a reasonable benefit/risk ratio, which is applicable to medical treatments, and the effective dose level can be determined according to a patient's disease type, severity, drug activities, sensitivity to a drug, administration time, administration route, excretion rate, treatment duration, factors including concurrent drugs and other factors well-known in the medical field. The pharmaceutical composition according to the present invention may be administered as an individual therapeutic agent, may be used in combination with surgeries, hormone therapies, drug therapies and biological response modifiers, may be administered simultaneously, separately, or sequentially with the agents, and may be administered in a single does or multiple doses. It is important to administer an amount capable of obtaining the maximum effect with a minimum amount without side effects in consideration of all of the above factors, which can be easily determined by those skilled in the art.

Specifically, the effective amount of the pharmaceutical composition of the present invention may vary depending on a patient's age, sex, conditions, weight, absorption of the active ingredient into the body, inactivation rate, excretion rate, disease type, and drugs used in combination, and may be increased or decreased according to the administration route, the severity of obesity, the sex, the weight, the age, and the like.

In addition, the present invention provides a health functional food for prevention or improvement of a bone disease, including the recombinant stabilized galectin 9 protein having the amino acid sequence represented by SEQ ID NO: 1, as an active ingredient.

In the present invention, the contents relating to the recombinant stabilized galectin 9 protein and bone diseases are the same as those described above, and specific descriptions thereof refer to the above content.

As used herein, the term "improvement" refers to any actions that at least reduces parameters related to the condition being treated, for example, the severity of symptoms. In this case, the health functional food composition may be used before or after the onset of the disease in order to prevent or improve a bone disease, simultaneously with or separately from a drug for treatment.

Meanwhile, in the present invention, it was confirmed that the recombinant stabilized galectin 9 protein having the amino acid sequence represented by SEQ ID NO: 1 exhibits Th1 and Th17 cell differentiation inhibitory effects, fibroblast-like-synoviocytes (FLS) apoptosis effects and osteoclast differentiation inhibitory effects. Therefore, the recombinant protein can be usefully used as an active ingredient of a health functional food for prevention or improvement of a bone disease.

In the health functional food of the present invention, the active ingredient may be added to food as it is or used together with other food or food ingredients, and may be appropriately used according to a method in the related art. The mixing amount of the active ingredients may be appropriately determined depending on the purpose of its use (for prevention or improvement). In general, in the preparation of food or beverage, the health functional food of the present invention may be added in an amount of preferably 15% by weight or less and preferably 10% by weight or less, with respect to the raw material. However, if the purpose is for health and hygiene or in the case of long-term intake for the purpose of health control, the amount may be equal to or less than the above range.

The health functional food of the present invention may include other ingredients as essential ingredients without any particular limitation other than the containing of the above active ingredients. For example, as in general beverages, various flavoring agents, natural carbohydrates, or the like may be included as additional ingredients. Examples of the above natural carbohydrates include monosaccharides such as glucose and fructose; disaccharides such as maltose and sucrose; and polysaccharides, for example, general sugars such as dextrin and cyclodextrin, and sugar alcohols such as xylitol, sorbitol, and erythritol. In addition to those described above, as flavoring agents, natural flavoring agents (thaumatin, stevia extract (for example, rebaudioside A and glycyrrhizin)) and synthetic flavoring agents (saccharin, aspartame, and the like) may be advantageously used. The ratio of the natural carbohydrate may be appropriately determined by the selection of those skilled in the art.

In addition to the above, the health functional food of the present invention may include various nutrients, vitamins, minerals (electrolytes), flavoring agents such as synthetic and natural flavoring agents, coloring agents and thickeners (cheese, chocolate, and the like), pectic acid and salts thereof, alginic acid and salts thereof, organic acids, protective colloidal thickeners, pH adjusters, stabilizers, preservatives, glycerin, alcohols, carbonates used in carbonated beverages, and the like. These components may be used independently or in combination, and the proportion of these additives may also be appropriately selected by those skilled in the art.

In addition, the present invention provides a method for preventing or treating a bone disease, including administering, to an individual, a pharmaceutically effective amount of the recombinant stabilized galectin 9 protein having the amino acid sequence represented by SEQ ID NO: 1 or a polynucleotide that encodes the same.

In addition, the present invention provides a method for preventing or improving a bone disease, including administering, to an individual, a pharmaceutically effective amount of the recombinant stabilized galectin 9 protein having the amino acid sequence represented by SEQ ID NO: 1 or a polynucleotide that encodes the same.

The recombinant stabilized galectin 9 protein having the amino acid sequence represented by SEQ ID NO: 1 of the present invention or a polynucleotide that encodes the same exhibits Tim-3 protein binding synergistic effects, Th1 and Th17 cell differentiation inhibitory effects, helper T cell inhibitory effects, fibroblast-like-synoviocytes (FLS) apoptosis effects, osteoclast differentiation inhibitory effects and bone resorption inhibitory effects, and thus can be usefully used to treat a bone disease.

In addition, the present invention provides a pharmaceutical composition used for prevention or treatment of a bone disease, including the recombinant stabilized galectin 9 protein having the amino acid sequence represented by SEQ ID NO: 1 or a polynucleotide that encodes the same.

In addition, the present invention provides a health functional food used for prevention or improvement of a bone disease, including the recombinant stabilized galectin 9 protein having the amino acid sequence represented by SEQ ID NO: 1 or a polynucleotide that encodes the same.

In addition, the present invention provides the use of the recombinant stabilized galectin 9 protein having the amino acid sequence represented by SEQ ID NO: 1 or a polynucleotide that encodes the same for the preparation of a pharmaceutical composition for prevention or treatment of a bone disease.

In addition, the present invention provides the use of the recombinant stabilized galectin 9 protein having the amino acid sequence represented by SEQ ID NO: 1 or a polynucleotide that encodes the same for the preparation of a health functional food for prevention or improvement of a bone disease.

Hereinafter, the present invention is be described in more detail through preparation examples and examples. However, the following preparation examples and examples are intended to help the understanding of the present invention and are not intended to limit the scope of the present invention.

<Preparation Example 1> Preparation of Recombinant Stabilized Galectin 9 Protein An expression vector including a gene that encodes the recombinant stabilized galectin 9 protein having the amino acid sequence of SEQ ID NO: 1 was prepared, and the expression vector was introduced into E. coli by a heat shock method. The recombinant protein was expressed by culturing E. coli in an LB medium including 50 μg/ml of kanamycin and adding arabinose when the absorbance at 600 nm reached 0.7 to induce the expression of the recombinant protein. Then, the cells induced to express the recombinant protein were lysed and filtered, and the target protein was captured by using a cation exchange method, an affinity column, and the like to obtain a highly purified recombinant stabilized galectin 9 protein in a high yield.

<Example 1> Confirmation of Tim-3 Protein Binding Ability of Recombinant Stable Galectin 9 Protein (sGal-9)

100 μl of recombinant human Tim-3 (R&D systems, Cat. No. 10241-TI-050) at a concentration of 0.5 μg/ml was added to each well of a 96-well ELISA plate (Nunc, Cat. No. 44-2404-21), the reaction was carried out at room temperature for one night, and then the resultant was washed three times with DPBS (Dulbecco's phosphate-buffered saline; Welgene, Cat. No. LB011-02) including 0.05% Tween 20 (Sigma Cat. No. P9416). After washing, 200 μl of DPBS including 1% bovine serum albumin (BSA) was added to each well, incubated at room temperature for one hour, and washed three times with a wash buffer. After washing three times, the recombinant stabilized galectin 9 protein (sGal-9) obtained in <Preparation Example 1> was diluted to various concentrations (0, 5, 10 and 20 μg/ml) and added by 100 μl to each well, incubated at room temperature for two hours, and washed three times with a wash buffer.

For an experimental group, Gal-9 antibody (R&D systems, Cat. No. 1015238) was diluted to 1:1000 by using 1% BSA/DPBS and added by 100 μl to each well, incubated at room temperature for one hour, and washed three times with a wash buffer. As a control group, an anti-mouse HRP antibody (Invitrogen, Cat. No. 31430) was diluted to 1:1000 by using 1% BSA/DPBS and added by 100 μl to each well, incubated at room temperature for one hour, and washed three times with a wash buffer.

100 μl of a 1:1 mixture of substrate reagents (R&D systems, Cat. No. DY999) A and B was added to each washed well and incubated at room temperature with the light blocked for 20 minutes. After the incubation, 50 μl of a stop solution (2 N $H_2SO_4$) was added to each well, and the optical density (O.D) value was measured and checked at 450 nm using a microplate reader.

As a result, as shown in FIG. 1, it was confirmed that the optical density increased as the concentration of sGal-9 increased, and thus it was confirmed that the binding degree of sGal-9 and Tim-3 was excellent in a concentration-dependent manner (FIG. 1).

<Example 2> Confirmation of T Helper Cell Differentiation Inhibitory Effect of sGal-9

Anti-CD3 (eBioscience, Cat. No. 16-0031-82) at a concentration of 2 μg/ml diluted with PBS (Welgene, Cat. No. LB 001-02) was added to a 96-well plate by 100 μl or to a 24-well plate by 500 μl, was reacted at 4° C. for one night, was washed once with PBS, and was used for cell culture. After the resultant was dispensed into 96-well plates or 24-well plates coated with CD4, CD62L and T cells and incubated at 37° C. and 5% $CO_2$ conditions for four days, anti-IL-4, anti-IL-2 and anti-IL-12 cytokines were added to induce the differentiation into Th1 cells and anti-IFN-γ, anti-IL-4, anti-IL-2 and anti-IL-6 cytokines were added to induce differentiation into Th17 cells. After the addition of cytokines, sGal-9 with a concentration of 1 μg/ml was added and incubated at 37° C. and 5% $CO_2$ conditions for four days.

After the culture, IFN-γ cells of Th1 cells and IL-17 cytokines of Th17 cells were measured by using an ELISA assay kit (Mouse DuoSet, R&D Systems) according to the procedure of the manufacturer.

Figure 2:
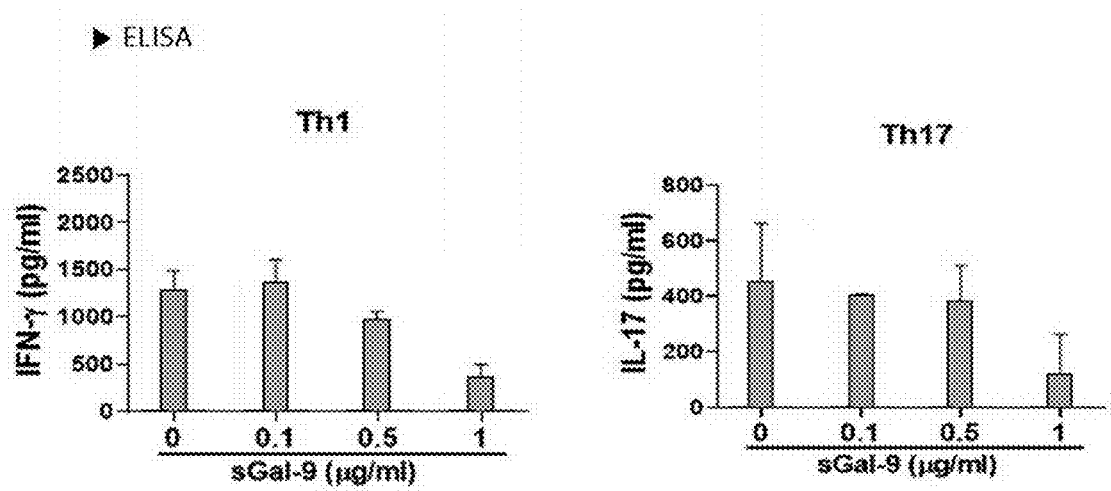
FIG. 2 is a figure showing Th1 and Th17 cell differentiation inhibitory effects of sGal-9 according to the present invention.

As a result, as shown in FIG. 2, it was confirmed that the differentiation of Th1 and Th17 cells which are the helper T cells was inhibited as the concentration of sGal-9 increased, and thus it was confirmed that the helper T cell differentiation inhibitory effect of sGal-9 was excellent (FIG. 2).

<Example 3> Confirmation of Fibroblast-Like-Synoviocytes (FLS) Apoptosis Effect of sGal-9

200 μl of the FLS cells (cell passage: RA FLS 2-92 #P7) were dispensed into each well of a 48-well plate (SPL, Cat. No. 30048) at a cell density of $5\times10^4$ cells/ml, and after 24 hours, 100 μl of sGal-9 at various concentrations (2.5, 5, and 10 μg/ml) was added to each well. After 16 hours, the supernatant was collected and stored in a deep freezer.

Cells for fluorescence activated cell sorting (FACS) were placed and washed in a 15 ml tube, 200 μl of FACS buffer was added thereto, and the resultant was stored at 4° C. for one hour and was stained with Annexin V-FITC/7-AAD (Biolegend, Cat. No. 640922). The stained cells were filtered with a 70 μm cell strainer (BD Falcon, Cat. No. 352350) into a tube for FACS.

Figure 3:
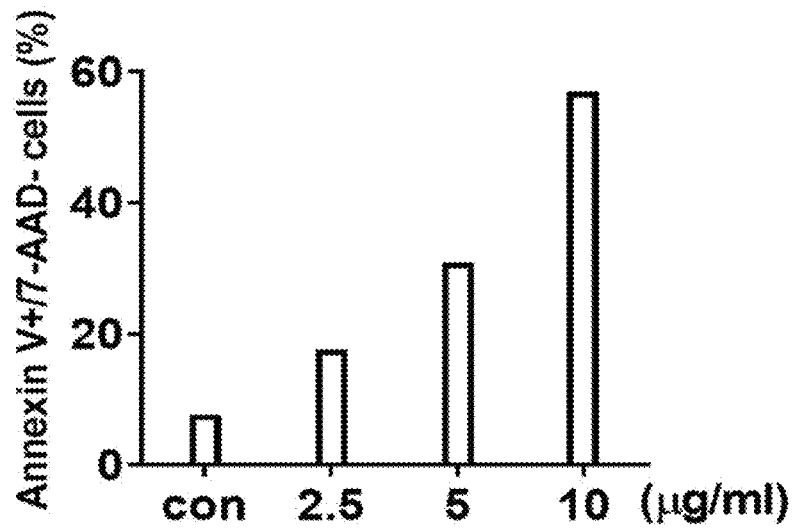
FIG. 3 is a figure showing fibroblast-like synoviocytes (FLS) apoptosis effects of sGal-9 according to the present invention.

As a result, as shown in FIG. 3, it was confirmed that the fibroblast-like-synoviocytes apoptosis effect increased as the concentration of sGal-9 increased, and thus it was confirmed that the synovial cell apoptosis effect of sGal-9 was excellent (FIG. 3).

<Example 4> Confirmation of Osteoclast Differentiation Inhibitory Effect of sGal-9

1 ml of osteoclasts was passaged in each well of a 12-well plate (Corning, Cat. No. 3513) at a cell density of $2.5\times10^5$ cells/ml, and after 24 hours, sGal-9 as an experimental group at various concentrations (0.1, 0.5, 1, 2, 4, and 10 μg/ml) and PBS as a control group were put into each well by 1 ml.

After completion of differentiation, the stained osteoclasts of the experimental group and the control group were TRAP-stained by using the TRAP Staining Kit (K-ASSAY, Cat. No. KT-008) and counted by using an optical microscope, and then multinucleated cells (TRAP(+) MNCs) in which three or more nuclei were observed was determined to be differentiated into osteoclasts.

Figure 4:
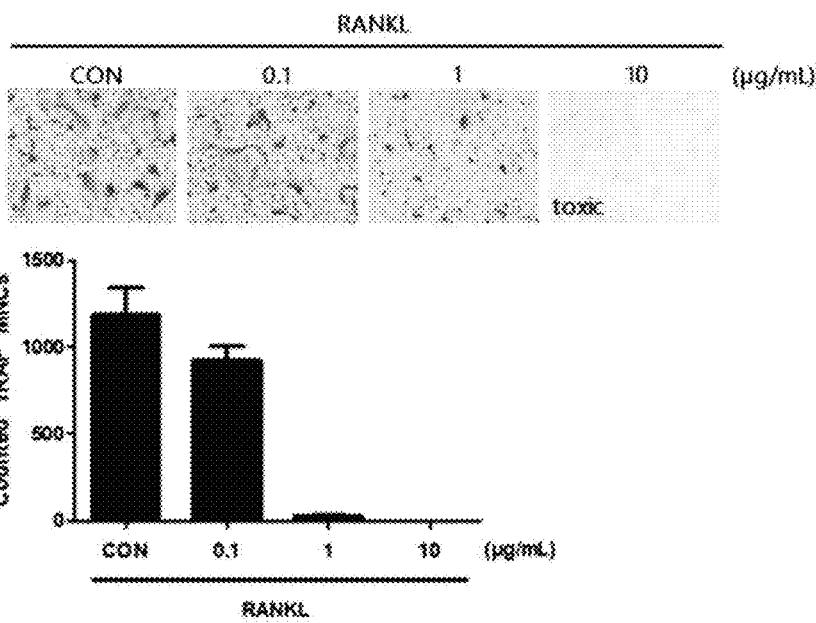
FIG. 4 is a figure showing osteoclast differentiation inhibitory effects of sGal-9 according to the present invention.

As a result, as shown in FIG. 4, it was confirmed that the number of stained osteoclasts decreased as the concentration of sGal-9 increased, and thus it was confirmed that the osteoclast differentiation inhibitory effect of sGal-9 was excellent (FIG. 4).

<Example 5> Confirmation of Bone Resorption Inhibitory Effect of sGal-9

1 ml of osteoclasts was passaged at a cell density of $2.5\times10^5$ cells/ml into each well of Osteo Assay Surface multi-well plate (Corning, Cat. No. 3987) coated with inorganic three-dimensional crystalline that resembled the bone structure in vivo, and after 24 hours, sGal-9 as an experimental group at various concentrations (0.1, 0.5, 1, 2, 4, and 10 μg/ml) and PBS as a control group were put into each well by 1 ml. The experimental group (sGal-9), the control (PBS), and cell culture medium (MEM-alpha, gibco, Cat. No. 12561-056) were replaced daily until differentiation was completed.

After completion of differentiation, cells were removed with 20% SDS (Bleaching solution), and the Osteo Assay Surface multi-well plate was observed under a microscope.

Figure 5:
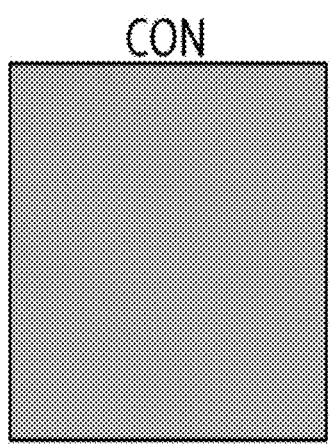
FIG. 5 is a figure showing the bone resorption inhibitory effect of sGal-9 according to the present invention.
Figure 5:
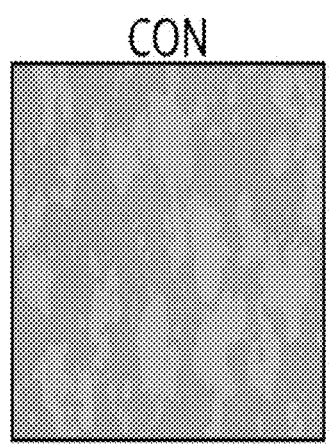
Figure 5:
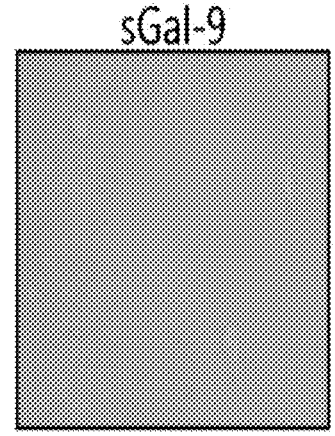

As a result, as shown in FIG. 5, it was confirmed that the bone resorption inhibitory effect of sGal-9 was excellent (FIG. 5).

In conclusion, through the results of <Example 1> to <Example 5>, it was confirmed that bone diseases could be prevented or treated by sGal-9 in a concentration-dependent manner, through the increase in the Tim-3 protein binding ability, the increases in the Th1 and Th17 cell differentiation inhibitory effect and the synovial cell apoptosis effect, and the increases in the osteoclast differentiation inhibitory effect and the bone resorption inhibitory effect.

The invention claimed is:

1. A method for treatment of a bone disease, comprising: administering to an individual in need thereof a pharmaceutically effective amount of a recombinant stabilized galectin 9 protein having the amino acid sequence set forth as SEQ ID NO: 1, wherein the bone disease is rheumatoid arthritis.

2. The method according to claim 1, wherein the recombinant stabilized galectin 9 protein exhibits one or more of the following properties:
   i) an increased binding to a Tim-3 protein;
   ii) inhibition of Th1 and Th17 cell differentiation;
   iii) inhibition of T helper cells;
   iv) induction of apoptosis of fibroblast-like synoviocytes (FLS); and
   v) inhibition of osteoclast differentiation and bone resorption.

3. The method according to claim 1, wherein the recombinant stabilized galectin 9 protein is administered with a pharmaceutically acceptable carrier.

4. The method according to claim 1, wherein the recombinant stabilized galectin 9 protein is administered orally, intramuscularly, intravenously, intraperitoneally, subcutaneously, intradermally, or topically.

* * * * *